US 9,229,863 B2

(12) United States Patent
Yoshihashi et al.

(10) Patent No.: US 9,229,863 B2
(45) Date of Patent: Jan. 5, 2016

(54) SEMICONDUCTOR STORAGE DEVICE

(75) Inventors: Eiji Yoshihashi, Kanagawa (JP);
Hirokuni Yano, Tokyo (JP); Shinji Yonezawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 720 days.

(21) Appl. No.: 13/462,905

(22) Filed: May 3, 2012

(65) Prior Publication Data
US 2012/0221776 A1 Aug. 30, 2012

Related U.S. Application Data

(63) Continuation of application No. PCT/JP2010/073653, filed on Dec. 20, 2010.

(30) Foreign Application Priority Data

Dec. 18, 2009 (JP) ................................. 2009-288503

(51) Int. Cl.
*G06F 12/00* (2006.01)
*G06F 12/08* (2006.01)

(52) U.S. Cl.
CPC ........ *G06F 12/0804* (2013.01); *G06F 12/0866* (2013.01); *G06F 2212/214* (2013.01)

(58) Field of Classification Search
CPC .................................................. G06F 12/0246
USPC .......................................................... 711/173
See application file for complete search history.

(56) References Cited

U.S. PATENT DOCUMENTS

| 7,949,910 | B2 | 5/2011 | Kanno |
| 7,953,920 | B2 | 5/2011 | Yano |
| 7,958,411 | B2 | 6/2011 | Kanno |
| 7,962,688 | B2 | 6/2011 | Yano |
| 8,015,347 | B2 | 9/2011 | Kitsunai |
| 8,060,797 | B2 | 11/2011 | Hida |

(Continued)

FOREIGN PATENT DOCUMENTS

| JP | 2005-293119 | 10/2005 |
| JP | 2008-198208 | 8/2008 |

(Continued)

OTHER PUBLICATIONS

"Information Technology—ATA/ATAPI Command Set-2 (ACS-2)", Revision 1a, American National Standards Institute Inc., pp. 93-94, Mar. 2009, http://www.t13.org/Documents/UploadedDocuments/docs2009/d2015r1a-ATAATAPI_Command_Set_-_2_ACS-2.pdf.

(Continued)

*Primary Examiner* — Charles Rones
*Assistant Examiner* — Ryan Dare
(74) *Attorney, Agent, or Firm* — Oblon, McClelland, Maier & Neustadt, L.L.P.

(57) ABSTRACT

According to the embodiments, a first storage area and a second storage area specified by a trim request is managed by a first management unit, and the second storage area specified by the trim request is managed by a second management unit. A block in which data of the first management unit are all specified by the trim request from the first or second storage areas and a block in which data of the second management unit are all specified by the trim request from the second storage area are released.

20 Claims, 14 Drawing Sheets

(56) References Cited

U.S. PATENT DOCUMENTS

| | | | |
|---|---|---|---|
| 8,065,470 B2 | 11/2011 | Yano | |
| 8,065,471 B2 | 11/2011 | Yano | |
| 2008/0195799 A1* | 8/2008 | Park | 711/103 |
| 2010/0037009 A1* | 2/2010 | Yano et al. | 711/103 |
| 2010/0037010 A1 | 2/2010 | Yano et al. | |
| 2010/0037011 A1 | 2/2010 | Yano et al. | |
| 2010/0037012 A1 | 2/2010 | Yano et al. | |
| 2010/0161885 A1 | 6/2010 | Kanno | |
| 2010/0169549 A1 | 7/2010 | Yano | |
| 2010/0169551 A1 | 7/2010 | Yano | |
| 2010/0169553 A1 | 7/2010 | Yano | |
| 2010/0180072 A1 | 7/2010 | Kogita et al. | |
| 2010/0217927 A1 | 8/2010 | Song et al. | |
| 2010/0223424 A1 | 9/2010 | Kitsunai | |
| 2011/0173380 A1 | 7/2011 | Yano | |
| 2011/0238899 A1 | 9/2011 | Yano | |
| 2012/0159244 A1 | 6/2012 | Hirao et al. | |
| 2012/0246388 A1 | 9/2012 | Hashimoto | |
| 2012/0246393 A1 | 9/2012 | Hashimoto | |

FOREIGN PATENT DOCUMENTS

| | | |
|---|---|---|
| WO | 2009-001514 | 12/2008 |
| WO | 2009/084724 A1 | 7/2009 |

OTHER PUBLICATIONS

U.S. Appl. No. 13/420,051, filed Mar. 14, 2012, Hida et al.
Japanese Office Action issued Jul. 23, 2013, in Japan Patent Application No. 2009-288503 (with English translation).
U.S. Appl. No. 13/242,482, filed Sep. 23, 2011, Nishikubo.
U.S. Appl. No. 13/420,808, filed Mar. 15, 2012, Hashimoto.
U.S. Appl. No. 13/613,379, filed Sep. 13, 2012, Morita.
U.S. Appl. No. 13/599,087, filed Aug. 30, 2012, Yonezawa, et al.
U.S. Appl. No. 13/609,991, filed Sep. 11, 2012, Hirao et al.

* cited by examiner

FIG.4

BLOCK MANAGEMENT TABLE 50

| LOGICAL BLOCK ADDRESS | MANAGEMENT INFORMATION | | | |
|---|---|---|---|---|
| | PHYSICAL BLOCK ADDRESS | ... | INVALID FLAG | TRIM FLAG |
| 0 | | ... | 1 | 0 |
| 1 | | ... | 0 | 1 |
| ⋮ | | ... | | 0 |
| N | | ... | | |

FIG.5

PAGE MANAGEMENT TABLE 60

| LOGICAL PAGE ADDRESS | MANAGEMENT INFORMATION | | | | |
|---|---|---|---|---|---|
| | AFFILIATION | PHYSICAL BLOCK ADDRESS + INTRA-BLOCK PAGE POSITION | ... | INVALID FLAG | TRIM FLAG |
| 0 | FS | | ... | 1 | 0 |
| 1 | MS | | ... | 0 | 1 |
| ⋮ | | | ... | | |
| M | IS | | ... | 1 | |

FIG.6

PAGE MANAGEMENT TABLE 60

| PHYSICAL BLOCK ADDRESS | MANAGEMENT INFORMATION ||||  |
|---|---|---|---|---|---|
|  | LOGICAL PAGE ADDRESS | ... | INVALID FLAG | TRIM FLAG |  |
| PHYSICAL BLOCK ADDRESS X | LOGICAL ADDRESS A | ... | 1 | 0 | 0 (PAGE 0) |
|  | LOGICAL ADDRESS B | ... | 1 | 0 | 1 (PAGE 1) |
|  |  | ... | 0 | 1 | 2 (PAGE 2) |
|  |  | ... | 0 | 1 | 3 (PAGE 3) |
|  | LOGICAL ADDRESS C | ... | 1 | 0 | ⋮ |
|  | WRITABLE | ... |  |  |  |
|  | ⋮ | ⋮ | ⋮ |  |  |
| PHYSICAL BLOCK ADDRESS Y |  | ... | 0 |  | 0 (PAGE 0) |
|  | LOGICAL ADDRESS D | ... | 1 |  | 1 (PAGE 1) |
|  |  | ... | 0 |  | 2 (PAGE 2) |
|  | LOGICAL ADDRESS E | ... | 1 |  | 3 (PAGE 3) |
|  | WRITABLE | ... |  |  | ⋮ |
|  | ⋮ | ⋮ | ⋮ |  |  |
|  | ⋮ | ⋮ | ⋮ | ⋮ |  |

FIG.7

PHYSICAL BLOCK MANAGEMENT TABLE 70

| | USED/UNUSED |
|---|---|
| PHYSICAL BLOCK ADDRESS A | MS (USED) |
| PHYSICAL BLOCK ADDRESS B | FS (USED) |
| PHYSICAL BLOCK ADDRESS C | UNUSED |
| PHYSICAL BLOCK ADDRESS D | IS (USED) |
| ⋮ | |

FIG.11

SECTOR MANAGEMENT TABLE 80

| PHYSICAL PAGE ADDRESS | MANAGEMENT INFORMATION | | | | |
|---|---|---|---|---|---|
| | LOGICAL SECTOR ADDRESS | ... | INVALID FLAG | TRIM FLAG | |
| PHYSICAL PAGE ADDRESS X | LOGICAL ADDRESS A | ... | 1 | 0 | 0 (SECTOR 0) |
| | LOGICAL ADDRESS B | ... | 1 | 0 | 1 (SECTOR 1) |
| | / | ... | 0 | 1 | 2 (SECTOR 2) |
| | / | ... | 0 | 1 | 3 (SECTOR 3) |
| | LOGICAL ADDRESS C | ... | 1 | 0 | ⋮ |
| | ⋮ | ⋮ | ⋮ | | |
| PHYSICAL PAGE ADDRESS Y | / | ... | 0 | | 0 (SECTOR 0) |
| | LOGICAL ADDRESS D | ... | 1 | | 1 (SECTOR 1) |
| | / | ... | 0 | | 2 (SECTOR 2) |
| | LOGICAL ADDRESS E | ... | 1 | | 3 (SECTOR 3) |
| | ⋮ | ⋮ | ⋮ | | ⋮ |
| ⋮ | ⋮ | ⋮ | ⋮ | | |

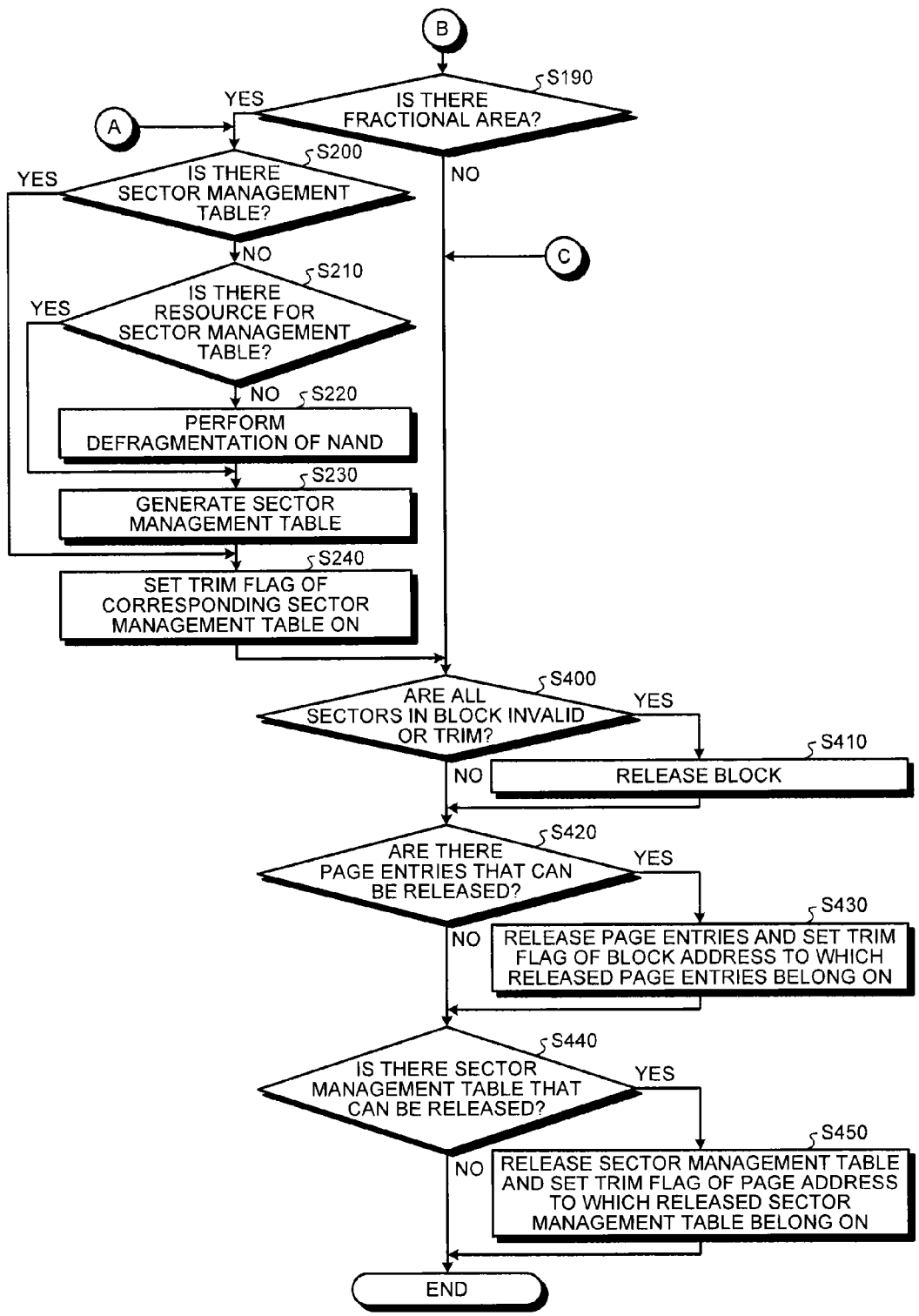

SEMICONDUCTOR STORAGE DEVICE

CROSS-REFERENCE TO RELATED APPLICATIONS

This application is a continuation of PCT international application Ser. No. PCT/JP2010/073653 filed on Dec. 20, 2010 which designates the United States and claims the benefit of priority from Japanese Patent Application No.2009-288503 filed on Dec. 18, 2009; the entire contents of which are incorporated herein by reference.

FIELD

Embodiments described herein relate generally to a semiconductor storage device that includes a nonvolatile semiconductor memory.

BACKGROUND

For example, when an HDD (Hard Disk Drive) as a storage device used in a host device is replaced by a semiconductor storage device such as a flash memory, data stored in the HDD is considered to be copied to the flash memory. When there is a bad sector in this HDD, data read out from a sector address indicating a storage position of the bad sector is read out as erroneous data that cannot be restored.

BRIEF DESCRIPTION OF THE DRAWINGS

FIG. 4 is a diagram illustrating a configuration example of a block management table;

FIG. 5 is a diagram illustrating a configuration example of a page management table;

FIG. 6 is a diagram illustrating another configuration example of the page management table;

FIG. 7 is a diagram illustrating a configuration example of a physical block management table;

FIG. 11 is a diagram illustrating a configuration example of a sector management table;

FIGS. 12A and 12B is a flowchart illustrating an operation example of a second embodiment;

DETAILED DESCRIPTION

Figure 1:
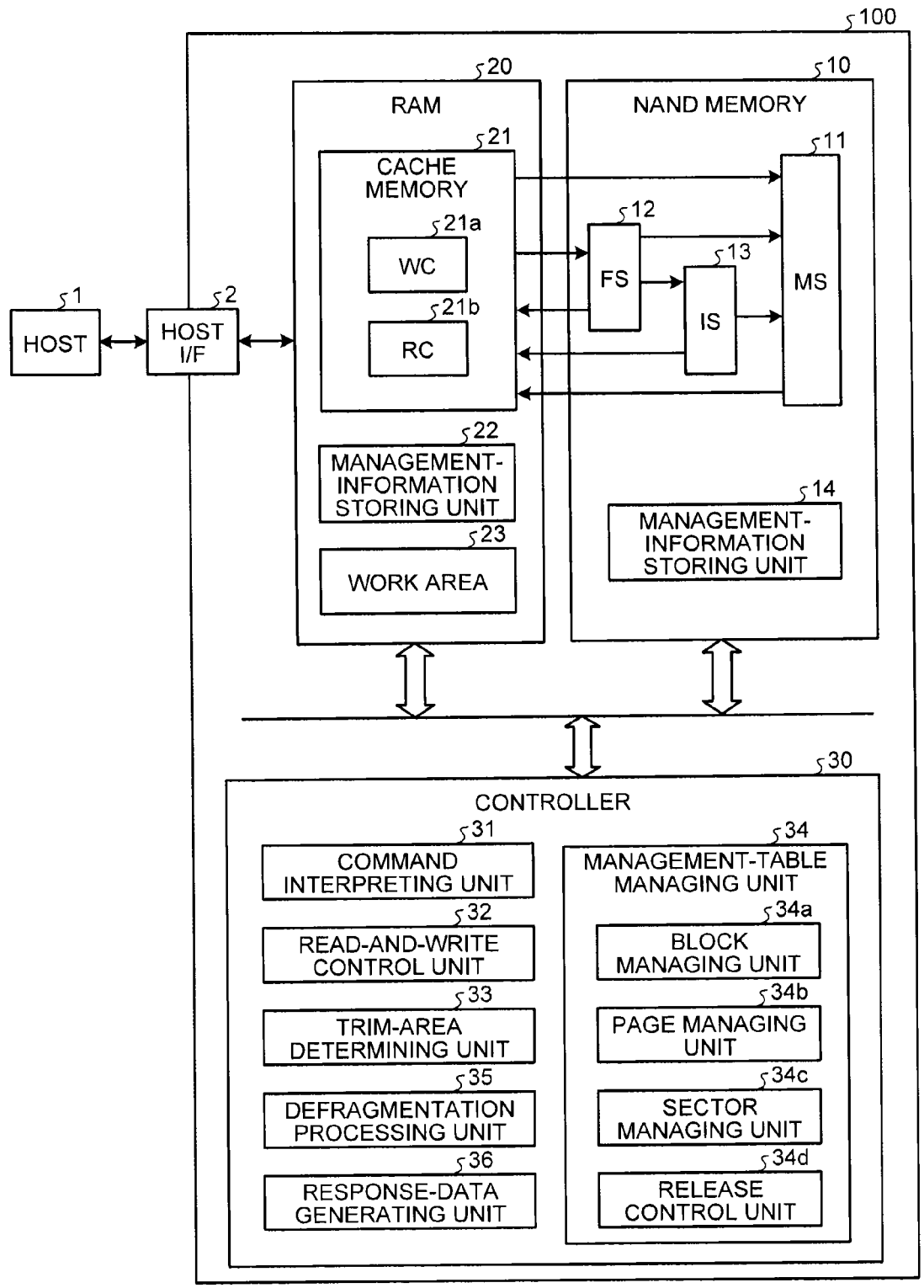
FIG. 1 is a block diagram illustrating a system configuration of a semiconductor storage device according to an embodiment of the present invention.

In general, according to one embodiment, a semiconductor storage device comprising a nonvolatile semiconductor memory and a controller. The nonvolatile semiconductor memory includes a first storage area that includes a plurality of blocks and in which data is managed by a first management unit larger than a sector unit and a second storage area that includes a plurality of blocks and in which data is managed by a second management unit larger than the first management unit. The controller configured to manage data stored in the first and second storage areas. The controller includes a command interpreter, a first manager, a second manager, and a release controller. The command interpreter configured to interpret a trim request notified from a host apparatus. The first manager configured to manage data specified by the trim request and stored in the first or second storage areas by the first management unit. The second manager configured to manage data specified by the trim request and stored in the second storage area by the second management unit. The release controller configured to release a block in which data of the first management unit are all specified by the trim request, from the first or second storage areas, and a block in which data of the second management unit are all specified by the trim request, from the second storage area.

Exemplary embodiments of semiconductor storage device will be explained below in detail with reference to the accompanying drawings. The present invention is not limited to the following embodiments.

Recently, in a DATA SET MANAGEMENT command of an ATA command set, an attribute (bit) of "TRIM" is defined. In the following explanation, the DATA SET MANAGEMENT command including a TRIM bit is called a TRIM command. The TRIM command notifies a storage device of a storage area that becomes unnecessary for an OS from a host (OS) and is specified by an LBA in sector units. For the command of the TRIM, for example, the following document can be referred to, so that detailed explanation is omitted here (http://www.t13.org/Documents/UploadedDocuments/docs2009/d2 015r1a-ATAATAPI_Command_Set_-_2_ACS-2.pdf). The TRIM command is not limited to a command of an ATA standard and can be a command defined by other standards so long as the similar content is included.

The specifications of the TRIM command have an option of Deterministic Read After Trim (DRAT) in which when an area trimmed by the TRIM command is read by a read command, a specific value is required to return. The TRIM command, for example, includes a code indicating that the command is the TRIM (DRAT) command, a start address of the LBA that is a logical address in sector units, and a size (the number of sectors). A first embodiment is to respond to normally the TRIM command and a second embodiment is to respond to the DRAT command.

First, a comparison example is explained. In a NAND memory, erasing is performed in block units and writing is performed in page units, so that there is a difference from the TRIM command specified in sector units (block>page>sector). In the case of a semiconductor storage device that is managed only in block units, it is possible to respond only to the TRIM command in which a TRIM range of the LBA completely matches address boundaries in block units of the LBA.

Figure 15:
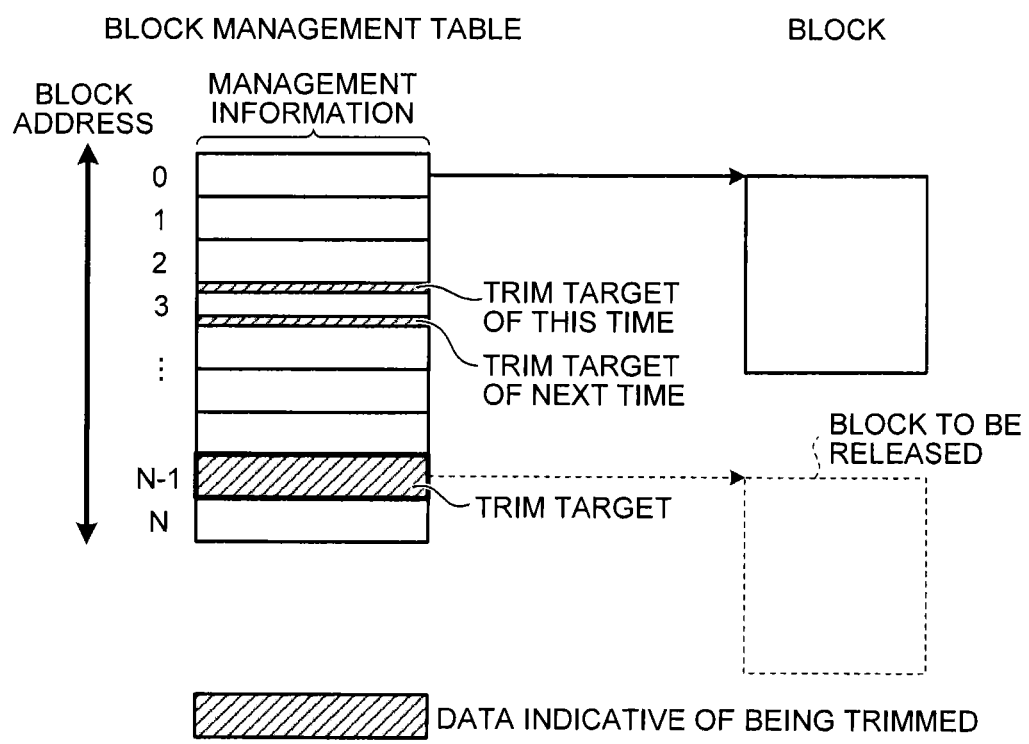
FIG. 15 is a diagram for explaining a comparison example.

FIG. 15 illustrates the case where the TRIM range of the LBA is specified as an LBA block address N−1, and when the TRIM range completely matches the address boundaries in block units in this manner, it is possible to release the block N−1, which is a block in which a use is allocated, as a free block in which valid data is not included and a use is not allocated. However, in the case of only a block management, for example, as shown in a block address 3 of FIG. 15, when pages in one block are specified by different TRIM commands, the block cannot be released even if all pages in the block address 3 become a TRIM target. Moreover, in the case of managing only in block units, it is needed for supporting the DRAT to once read out a block of the NAND memory that includes the TRIM range to a buffer in response to a TRIM request in units smaller than a block size, write a value determined by TRIM specifications only in a portion corresponding to the TRIM range on data, and write it back to the block of the NAND memory, so that unnecessary writing occurs.

(First Embodiment)

FIG. 1 is a block diagram illustrating a configuration example of an SSD (Solid State Drive) 100 as a semiconductor storage device. The SSD 100 is connected to a host device 1 (hereinafter, host) 1, such as a personal computer or a CPU core, via a memory connection interface such as an ATA interface (ATA I/F) 2 and functions as an external memory of the host 1. The SSD 100 includes a NAND-type flash memory (hereinafter, NAND memory) 10 capable of performing multi-value storage as a nonvolatile semiconductor memory, a RAM (Random Access Memory) 20 that functions as a cache memory or the like, and a controller 30 that performs a data transfer control between the host 1 and the NAND memory 10 via the RAM 20 and controls each component in the SSD 100.

Figure 2:
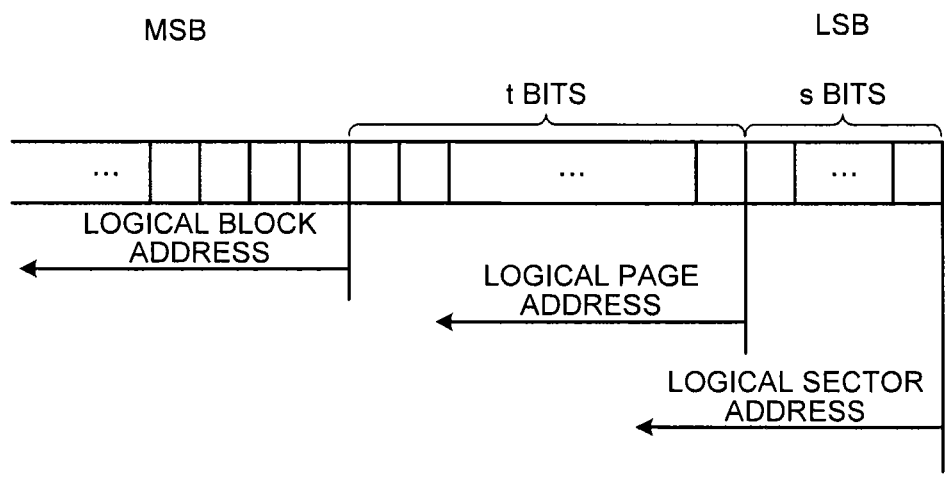
FIG. 2 is a diagram illustrating an LBA and a management unit.

When the host 1 performs Read or Write on the SSD 100, the host 1 inputs the LBA (Logical Block Addressing) as a logical address via the ATA I/F 2. As shown in FIG. 2, the LBA is the logical address in which serial numbers from zero are attached to sectors (size: 512 B). On the other hand, a unit of reading and writing of data in the NAND memory 10 has a size that is two to the s-th power of the sector size (size: 512 B), and a storage area of this unit is called a page. In one page of the NAND memory 10, areas of continuous LBA sector addresses are allocated.

The NAND memory 10 includes blocks as a minimum unit erasable independently inside thereof, and a block includes a plurality of (two to the t-th power) pages. In the present embodiment, as a management unit of a cache memory 21 and the NAND memory 10, a logical page address formed of a bit string equal to or higher in order than a low-order (s+1)th bit of the LBA and a logical block address formed of a bit string equal to or higher in order than a low-order (s+t+1)th bit of the LBA are defined.

The RAM 20 includes a cache memory (write cache (WC) 21a and read cache (RC) 21b) 21 that functions as a data transfer cache between the host 1 and the NAND memory 10, a management-information storing unit 22 that stores therein various management information, and a work area 23. The WC 21a temporarily stores therein Write data from the host 1 and outputs it to the NAND memory 10. The RC 21b temporarily stores therein Read data from the NAND memory 10 and outputs it to the host 1. When a resource of the WC 21a becomes insufficient, storage data in the WC 21a is flushed to the NAND memory 10. Data on the cache memory 21 is managed in sector units.

Figure 3:
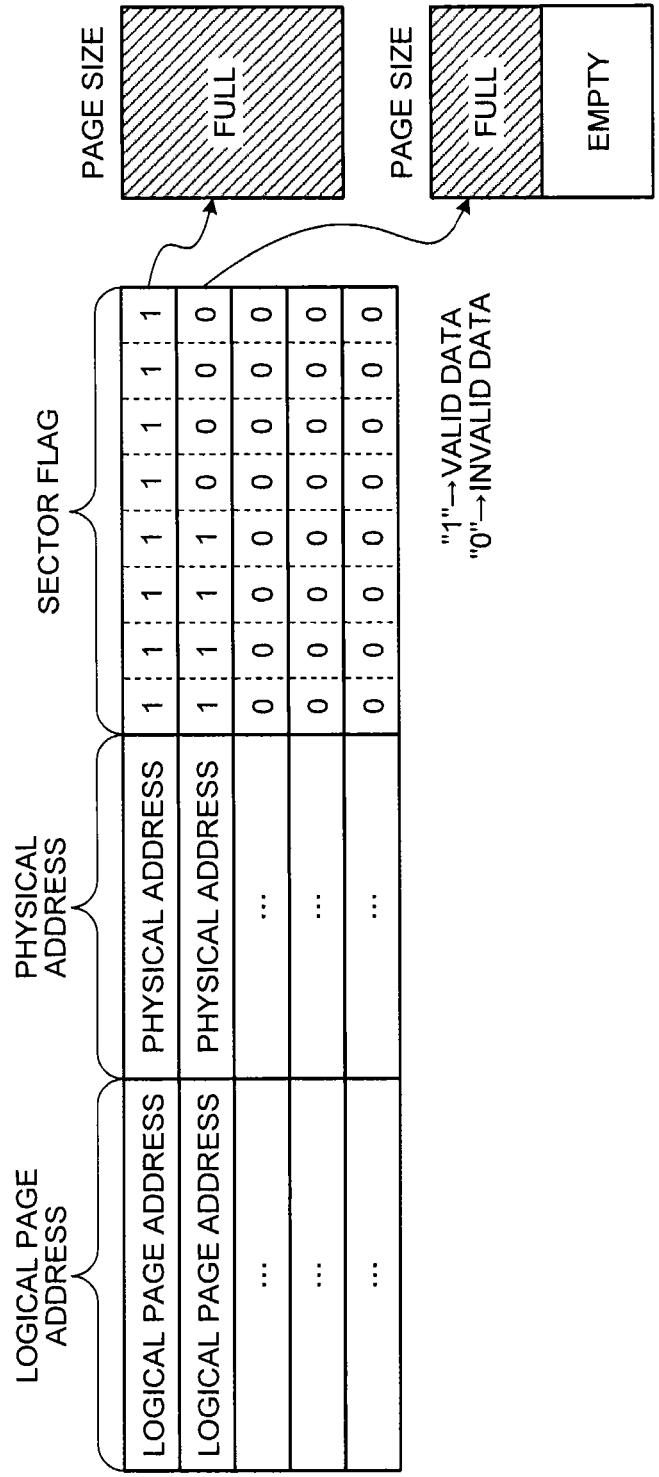
FIG. 3 is a diagram illustrating a configuration example of a cache management table.

FIG. 3 illustrates of a configuration example of a cache management table 40 that manages the cache memory 21. This cache management table 40 is generated in the management-information storing unit 22 of the RAM 20. The cache management table 40 manages data stored in the cache memory 21 in page units. Management of valid/invalid of data is performed in sector units. In each entry of the cache management table 40, the logical page address, a physical address indicating a storage position in the cache memory 21, and a sector flag representing a position of valid data in a corresponding area in page units are associated with each other. In the cache management table 40, each area in page units of the cache memory 21 is further divided into areas in sector units and a state of data in each area in sector units is indicated by setting a value of the sector flag to "valid" or "invalid". In an area in which the sector flag is "valid", valid data from the host 1 is stored. On the other hand, in an area in which the sector flag is "invalid", latest data written from the host 1 is not stored, so that this area becomes an invalid area. The valid data is the latest data, and the invalid data is data that is not to be referred as a result that data having the same logical address is written in a different location.

As shown in FIG. 1, blocks in the NAND memory 10 are allocated to respective management areas of a pre-stage storage area (FS: Front Storage) 12, an intermediate stage storage area (IS: Intermediate Storage) 13, and a main storage area (MS: Main Storage) 11 by the controller 30 in order to reduce an amount of erasing for the NAND memory 10 during writing. The FS 12 manages data from the WC 21a, for example, in page units, i.e., "small units" and stores small data for a short period. The IS 13 manages data overflowing from the FS 12 in page units, i.e., "small units" and stores small data for a long period. The MS 11 manages data from the WC 21a, the FS 12, and the IS 13 in block units, i.e., "large units". A block (high-density block) that has many valid pages on the WC 21a is directly written from the WC 21a to the MS 11 in block units. A block (low-density block) with smaller number of valid pages on the WC 21a is written on the FS 12 from the WC 21a in page units.

Main Storage Area (MS) 11

The MS 11 performs data management in block units, and most user data is stored in the MS 11. A block (high-density block) that has many valid pages on the WC 21a is directly written from the WC 21a to the MS 11. Moreover, data that cannot be managed by the FS 12 and the IS 13 is input to the MS 11. A block of which LBA is the same as a block input to the MS 11 is invalidated, and this block is released. A page that includes the LBA same as data included in a block input to the MS 11 is invalidated in the FS 12 or the IS 13, and a block in which all pages are invalidated is released. Continuous LBA page addresses aligned on block boundaries of the LBA are allocated to one block in the MS 11. On the other hand, in the FS 12 and the IS 13, page management is performed, so that continuous LBA sector addresses aligned on page boundaries of the LBA are allocated to one page in the FS 12 or the IS 13.

Pre-Stage Storage Area (FS) 12

The FS 12 is a buffer that adapts an FIFO structure in which data is managed in page units, and input is also performed in page units. A block (low-density block) with smaller number of valid pages on the WC 21a is first written on the FS 12. The FS 12 has the FIFO structure in which blocks are arranged in the order of data writing. When a page of which LBA is the same as a page present in the FS 12 is input to the FS 12, it is sufficient to invalidate the page in the FS 12, and a rewrite operation is not performed. The page of which LBA is the same as the page input to the FS 12 is invalidated in a block, and a block in which all pages are invalidated is released. A page stored in a block that reaches the end of the FIFO structure of the FS 12 is regarded as a page with low possibility of rewriting from the host 1 and the block as a whole is moved to the IS 13 under the management of the IS 13. Data with high update frequency is invalidated when passing through the FS 12 and only data with low update frequency overflows from the FS 12, so that the FS 12 can separate data with low update frequency from data with high update frequency. Consequently, it is possible to lower the possibility that a compaction occurs frequently in the IS 13 of a subsequent stage.

Intermediate Stage Storage Area (IS) 13

The IS 13 is a buffer for storing a page with low possibility of rewriting, and management of data is performed in page units in the similar manner to the FS 12. When a page of which LBA is the same as a page present in the IS 13 is input to the FS 12 or the IS 13, it is sufficient to invalidate the page in the IS 13, and the rewrite operation is not performed. In the similar manner to the FS 12, the IS 13 has a list structure in which blocks are arranged in order from a block on which data is written first (from a block that is moved from the FS 12 first); however, the IS 13 performs the compaction, which is different from the FS 12. When the capacity of the IS 13 is saturated or management tables for the FS 12 and the IS 13 are saturated, the compaction (collecting valid pages from the IS 13 and writing it back to the IS 13) or a defragmentation (integrating pages of the FS 12 and the IS 13 into a block and flushing it to the MS 11) is performed.

In the SSD 100, a relationship between the logical address and the physical address is not statically predetermined and a logical-to-physical translation system for dynamically associating at the time of writing data is employed.

For example, in the case of overwriting data on the same LBA address, the following block exchange is performed. A case is assumed where valid data is stored in a logical address A1 and a block B1 is used as a storage area. When a command for overwriting data (size is the same as a block) of the logical address A1 is received from the host 1, one free block (block B2) is secured and the data received from the host 1 is written in this free block. Thereafter, the logical address A1 is associated with the block B2. Consequently, the block B2 becomes an active block that includes the valid data and the block B1 becomes the free block because the data stored in the block B1 becomes invalid. In this manner, in the SSD 100, even for the data of the same logical address A1, a block that is used as an actual storage area changes in each writing.

FIG. 4 illustrates a configuration example of a block management table 50. The block management table manages data stored in the MS 11 in block units, and the configuration thereof is arbitrary so long as a correspondence relationship between the logical block address of the LBA and the physical block address indicating a block storage position in the NAND memory 10 is registered and an invalid flag indicating valid/invalid of each block and a TRIM flag indicating whether a TRIM specification is made are added. For example, as the block management table 50, a forward lookup table for obtaining the physical block address from the logical block address can be prepared, a reverse lookup for obtaining the logical block address from the physical block address can be prepared, or both of them can be prepared. Moreover, a double-linked list structure or the like can be employed.

In FIG. 4, in the block management table 50, management information is registered in an entry of each logical block address formed of an upper-order address equal to or higher than the (s+t+1)th bit of the LBA. The management information includes the physical block address indicating a storage position of data in the NAND memory 10 corresponding to the logical block address, the invalid flag indicating whether the block address is invalid or valid, and the TRIM flag indicating whether the TRIM specification is made. A block in which the invalid flag is on is a block that is not to be referred as a result that latest data having the same LBA is written in a different location. The TRIM flag and the invalid flag can be managed by the same flag.

FIG. 5 illustrates a configuration example of a page management table 60. FIG. 6 illustrates a configuration example of another page management table 60. The page management table manages data stored in the FS 12 and the IS 13 in page units, and the configuration thereof is arbitrary so long as a correspondence relationship between the logical page address of the LBA and information indicating the physical block address and an intra-block page position thereof that indicate a page storage position in the NAND memory 10 is recorded and the invalid flag indicating valid/invalid of each page and the TRIM flag indicating whether the TRIM specification is made for each page are added. For example, as the page management table, a forward lookup table for obtaining a storage position in the NAND memory from the logical page address can be prepared, a reverse lookup for obtaining the logical page address from the storage position in the NAND memory can be prepared, or both of them can be prepared. Moreover, a double-linked list structure or the like can be employed. For the MS 11 again, when the TRIM command is input, the page management table is generated as needed and the page management table is released when it is not needed anymore.

In FIG. 5, in the page management table 60, the management information is recorded in an entry of each logical page address formed of a bit string equal to or higher in order than the low-order (s+1)th bit of the LBA. The management information includes affiliation information indicating which area among the MS 11, the FS 12, and the IS 13 latest data corresponding to the page address is stored in, the physical block address+the intra-block physical page position as physical address information indicating a storage position of data in the NAND memory 10 corresponding to the logical page address, the invalid flag indicating whether the page address is invalid or valid, and the TRIM flag indicating whether the TRIM specification is made for the page. A page in which the invalid flag is on is a page that is not to be referred as a result that latest data having the same LBA is written in a different location. In the page management table again, the TRIM flag and the invalid flag can be managed by the same flag.

In FIG. 6, the page management table 60 includes block entries for a plurality of physical block addresses and page entries for the number of pages (two to the t-th power) in a physical block for each block entry. In each page entry, the management information that includes the logical page address of the LBA, the invalid flag indicating whether the page address is invalid or valid, and the TRIM flag indicating whether the TRIM specification is made for the page is recorded. In the page management table 60 in FIG. 6, an intra-physical-block physical page address is managed by a storage position in a block entry. For example, data of a logical page address A is stored in a page 0 of a physical block address X, and data of a logical page address D is stored in a page 1 of a physical block address Y. In the following explanation, when generating the page management table for the MS 11, the page management table as shown in FIG. 6 is generated.

FIG. 7 illustrates a configuration example of a physical block management table 70. The physical block management table 70 manages a usage of a physical block in the NAND memory 10. The physical block management table 70 stores therein the usage (which area among the MS 11, the FS 12, and the IS 13 a block is used in and whether a block is unused) of a block as the management information in an entry for each physical block address. The unused block means that the block is a free block.

The management information such as the block management table 50, the page management table 60, and the physical block management table 70 for managing the NAND memory 10 is managed in the management-information storing unit 22 of the RAM 20. The management information managed in the management-information storing unit 22 of the RAM 20 is stored in a management-information storing unit 14 of the NAND memory 10 periodically or at an arbitrary timing to make it nonvolatile for backup.

In the first embodiment, the TRIM area is managed in two stages, i.e., in block units and in page units, so that release of a block is performed in response also to the TRIM request in page units. Moreover, the management table is operated to respond to the TRIM command without accessing the NAND memory 10. As described above, in the FS 12 and the IS 13 of the NAND memory 10, management is performed in page units, so that when the TRIM request in page units is made to the FS 12 and the IS 13, the TRIM flag of the page management table 60 is set on, and when data of all physical pages in one physical block is invalid or the TRIM specification is made for the data, i.e., for example, when the invalid flag or the TRIM flag is set on for all page entries in a block entry for one physical address of the page management table 60 in FIG. 6, the physical block is released as a free block at this point and page entries of the page management table belonging to the released block are released.

On the other hand, because only the block management is performed in the MS 11, when the TRIM request in page units is made to the MS 11, the page management table for the MS 11 is generated and the TRIM flag of a corresponding page entry of the generated page management table is set on at the point when the TRIM request is made. In the MS 11, basically, only the block management is performed and the page management is performed only for the TRIM request, so that, in the page management table for the MS 11 to be generated, for example, a column of the invalid flag is set off (valid) from the beginning or only a column of the TRIM flag is referred to without referring to the column of the invalid flag. Then, when the TRIM request is made for data of all physical pages in one physical block, i.e., for example, when the TRIM flag for all page entries in a block entry for one physical address of the page management table 60 in FIG. 6 is set on, this physical block is released as a free block at this point and page entries of the page management table belonging to the block released are released. In this manner, the TRIM management is performed also in page units that is smaller than a block, so that a block is efficiently released as a free block by the TRIM command and the table capacity in the management-information storing unit 22 of the RAM 20 and the management-information storing unit 14 of the NAND memory 10 is reduced compared with the case of having the page management tables for all storage areas of the NAND memory 10.

It is applicable that the MS 11 responds only to the TRIM request in block units and does not respond to the TRIM request in page units. Moreover, it is applicable that an upper limit is set to the size of the page management table for the MS 11, and the MS 11 responds to the TRIM request in page units by generating the page management table until reaching this upper limit and does not respond to the TRIM request in page units after exceeding the upper limit.

In FIG. 1, the controller 30 includes a command interpreting unit 31, a read-and-write control unit 32, a TRIM-area determining unit 33, a management-table managing unit 34, a defragmentation processing unit 35, and a response-data generating unit 36.

The command interpreting unit 31 interprets a command received from the host 1 via the host I/F 2. The command transmitted from the host device includes a command for requesting reading of data, a command for requesting writing of data, and the above TRIM (DRAT) command. The command includes a logical sector address of the LBA. In the case of the TRIM (DRAT) command, a start logical sector address and a size (the number of sectors) are included. The command interpreting unit 31 interprets such a command and appropriately extracts a sector address of a read target or a write target, the start logical sector address of a TRIM (DRAT) target, the number of sectors, and the like in accordance with the command.

The read-and-write control unit 32 performs a data transfer control between the host 1 and the NAND memory 10 via the cache memory 21 based on the interpretation result of the command interpreting unit 31. Specifically, the read-and-write control unit 32 performs writing of data from the host 1 to the cache memory 21, reading of data to the host 1 from the cache memory 21, a data transfer from the MS 11, the FS 12, or the IS 13 of the NAND memory 10 to the cache memory 21, a data transfer from the cache memory 21 to the MS 11 or the FS 12, a data movement from the FS 12 to the IS 13, a data transfer from the IS 13 to the MS 11, and the like.

The TRIM-area determining unit 33 determines the capacity of the trim area specified by the TRIM command and the like. Specifically, the TRIM-area determining unit 33 determines whether the trim area specified by the TRIM command has a capacity equal to or more than one block, whether the trim area has a capacity equal to or more than one page, whether the trim area matches align boundaries in block units, whether the trim area matches align boundaries in page units, and the like.

The management-table managing unit 34 performs an update control of the management table including the cache management table 40, the block management table 50, the page management table 60, and the physical block management table 70. The management-table managing unit 34 functionally includes a block managing unit 34a, a page managing unit 34b, a sector managing unit 34c, and a release control unit 34d. The block managing unit 34a performs management in block units for the NAND memory 10. The page managing unit 34b performs management in page units for the NAND memory 10. The sector managing unit 34c performs management in sector units for the NAND memory 10. The release control unit 34d performs control of releasing a block, in which the TRIM specification is made for all sectors or pages, as a free block.

The defragmentation processing unit 35 performs the defragmentation processing for securing a resource for the page management table. In other words, it is determined whether there is a resource for storing the page management table in the RAM 20 and the NAND memory 10 by the management-table managing unit 34, and when it is determined that there is not enough resource, the defragmentation processing unit 35 performs the defragmentation processing. The defragmentation processing is processing of integrating page data in the FS 12 or the IS 13 into a block and flushing it to the MS 11. With this defragmentation processing, page entries of the page management table are reduced, and consequently, the resource for generating the page management table is secured in the management-information storing unit 22 of the RAM 20 and the management-information storing unit 14 of the NAND memory 10.

The response-data generating unit 36 is used in a second embodiment, and, when a read command is made to a sector address specified by the DRAT command, performs processing of generating predetermined response data and sending it to the read-and-write control unit 32. The response data, for example, includes a specific constant (for example, "0") and a random number. It is applicable that data stored in the physical address corresponding to a sector address extracted by the command interpreting unit 31 is used as the response data. In this case, the response-data generating unit 36 accesses the NAND memory 10 and reads out the data stored in the physical address.

Figure 8:
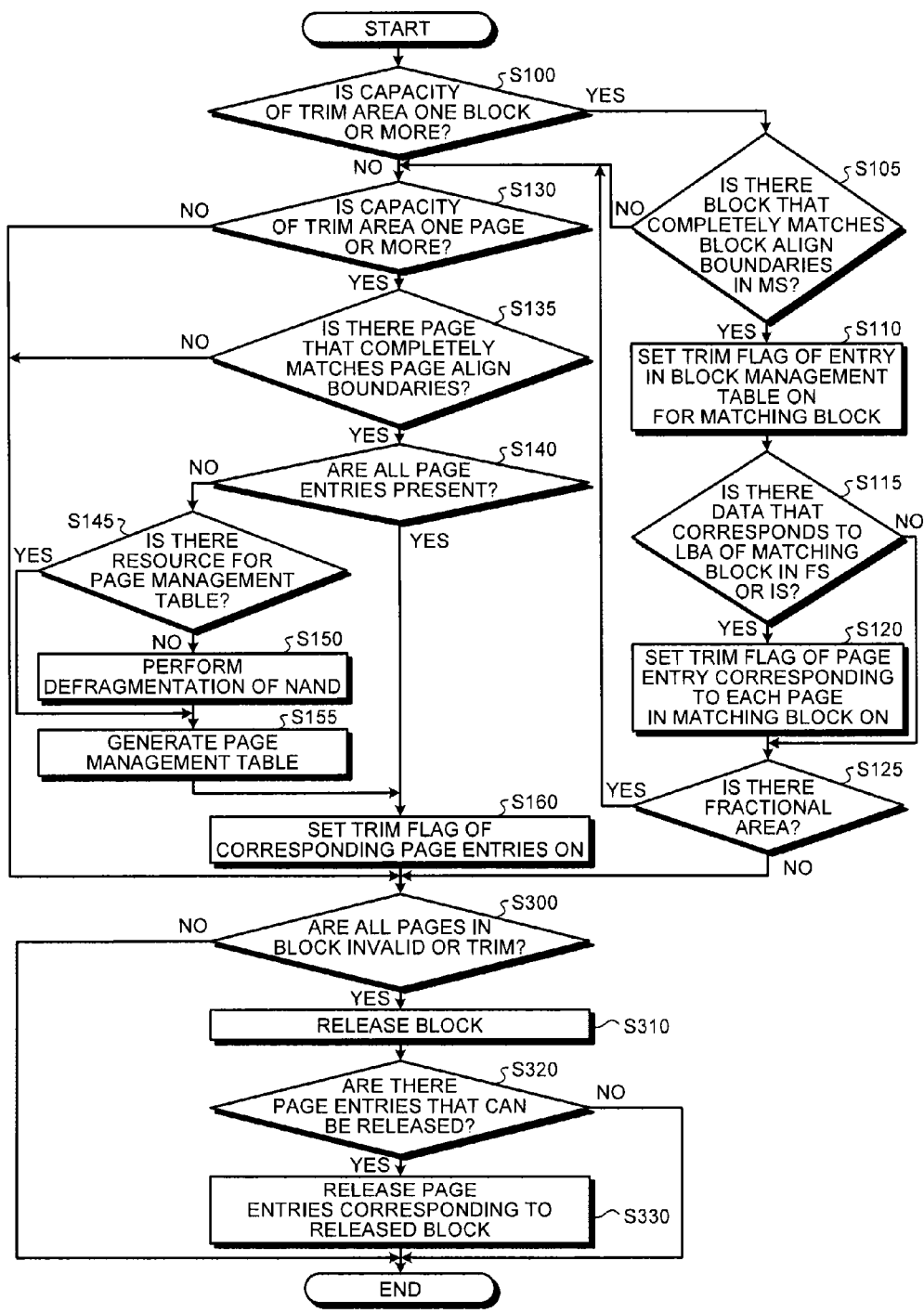
FIG. 8 is a flowchart illustrating an operation example of a first embodiment.

Next, TRIM response processing in the first embodiment is explained with reference to a flowchart shown in FIG. 8.

First, when the TRIM command including the start sector address and the number of sectors is input from the host, this TRIM command is interpreted by the command interpreting unit 31. The TRIM-area determining unit 33 determines whether the TRIM command is made for an area whose capacity is equal to or more than one block based on the interpretation result of the command interpreting unit 31 (Step S100). When the TRIM-area determining unit 33 determines that the TRIM command requests an area whose capacity is equal to or more than one block, the TRIM-area determining unit 33 next determines whether there is one or more blocks in the MS 11 that completely match address boundaries on which the TRIM range is aligned in block units in this TRIM area (Step S105).

Figure 9:
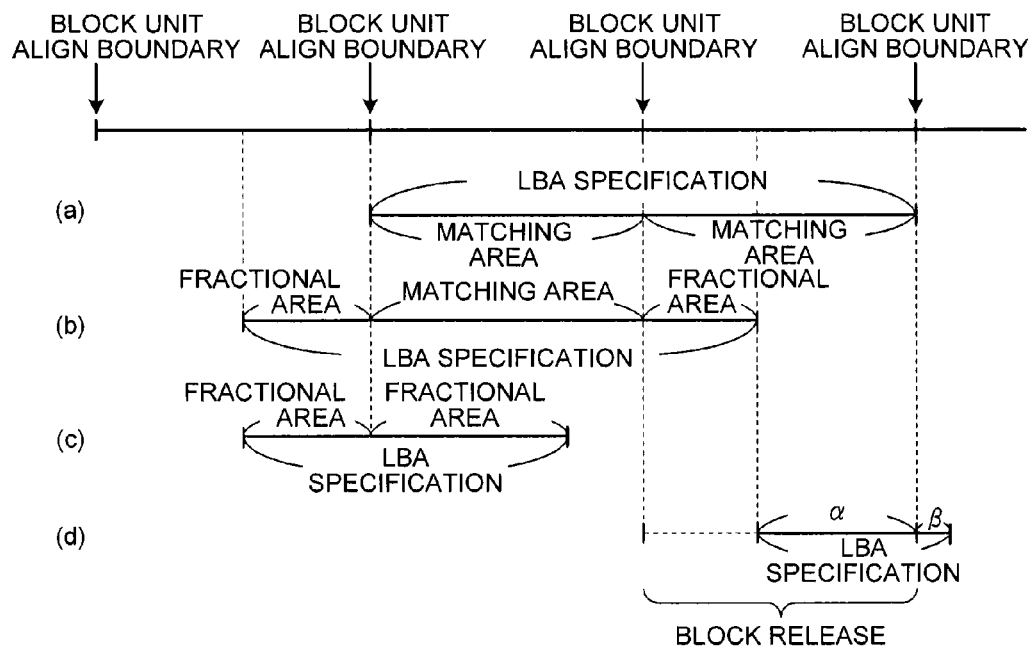
FIG. 9 is a diagram illustrating a relationship between a block align boundary and the LBA.

FIG. 9 illustrates a relationship between the align boundary in block units and the LBA sector address specified by the TRIM command. The case of (a) in FIG. 9 indicates that there are two blocks (shown as two matching areas in FIG. 9) that completely match the address boundaries aligned in block units and an LBA specification with no fractional area is made. The case of (b) in FIG. 9 indicates that there is one block (shown as one matching area in FIG. 9) that completely matches the address boundaries aligned in block units and the LBA specification including the fractional area that can be aligned only in page units or sector units is made. The case of (c) in FIG. 9 indicates that although the LBA specification is made for a capacity equal to or more than one block, only the fractional area that can be aligned only in page units or sector units is present in this LBA specification.

For example, in the case of (a) and (b) in FIG. 9, the determination at Step S105 is YES, and in the case of (c) in FIG. 9, the determination at Step S105 is NO. When the determination at Step S105 is NO, the block management cannot be performed, so that the procedure moves to Step S130 and the page management is performed. When the determination at Step S105 is YES, the management-table managing unit 34 sets the TRIM flag of the entry of the corresponding logical block address in the block management table 50 on for the blocks (matching areas) that completely match the address boundaries aligned in block units (Step S110).

Moreover, the management-table managing unit 34 searches the page management table 60 to determine whether valid data that has the logical page address same as data stored in the matching block in which the TRIM flag in the block management table 50 is set on is present in the FS 12 or the IS 13 (Step S115). When the management-table managing unit 34 determines that the valid data is present, the management-table managing unit 34 sets the TRIM flag of a corresponding page entry in the page management table 60 on (Step S120). When the management-table managing unit 34 determines that the valid data is not present in the determination at Step S115, the procedure moves to Step S125.

Next, the TRIM-area determining unit 33 determines whether the fractional area is present in the TRIM specification of this time (Step S125), and when the fractional area is not present, the procedure moves to Step S300. When the fractional area is present, the procedure moves to Step S130 and the page management is performed.

At Step S130, the TRIM-area determining unit 33 determines whether the TRIM area has a capacity equal to or more than one page. The TRIM area as the determination target at Step S130 includes a case where a requested area by the TRIM command itself has a capacity equal to or more than one page and less than one block (determination at Step S100 is NO), a case where the determination at Step S105 is NO as shown in (c) in FIG. 9, and a case where the determination at Step S125 is YES as shown in (b) in FIG. 9.

When the determination at Step S130 is YES, the TRIM-area determining unit 33 determines whether the TRIM area includes one or more pages that completely match the address boundaries aligned in page units (Step S135).

In this first embodiment, the fractional area, whose capacity is less than one page and which therefore can be aligned only in sector units, is not set as the TRIM target, so that when the determination at Step S130 is NO or the determination at Step S135 is NO, the procedure moves to Step S300. When the determination at Step S135 is YES, the management-table managing unit 34 determines whether all page entries are present in the page management table 60 for the pages that completely match the address boundaries aligned in page units (Step S140). The case where all page entries are present in the page management table 60 includes a first case where the valid pages of the TRIM target are stored in the FS 12 or the IS 13, a second case where page entries for one block for the MS 11 that includes the valid pages of the TRIM target are already generated, and a third case where both of the first and second cases occur. The case where not all page entries are present in the page management table 60 is a case where page entries for one block for the MS 11 need to be newly generated.

When the determination at Step S140 is YES, the management-table managing unit 34 sets the TRIM flag of the entries of the page addresses corresponding to the TRIM area in the page management table 60 on (Step S160).

On the other hand, when the determination at Step S140 is NO, the management-table managing unit 34 determines whether there is a resource for storing the page management table in the RAM 20 and the NAND memory 10 (Step S145), and when it is determined that there is not enough resource, the defragmentation processing unit 35 performs the defragmentation processing (Step S150) to secure the resource for storing the page management table in the NAND memory 10 and the RAM 20. As described above, the defragmentation processing is processing of integrating page data in the FS 12 or the IS 13 into a block and flushing it to the MS 11. With this defragmentation processing, page entries of the page management table are reduced, and consequently, the resource for generating the page management table is secured in the management-information storing unit 22 of the RAM 20 and the management-information storing unit 14 of the NAND memory 10.

When the determination at Step S145 is YES, or after performing the defragmentation of the NAND memory 10 at Step S150, the management-table managing unit 34 generates page entries in the page management table 60 for all of the pages that completely match the address boundaries aligned in page units (Step S155). Then, after generating the page entries in the page management table 60, the management-table managing unit 34 sets the TRIM flag of the entries of the page addresses corresponding to the TRIM area in the page management table 60 on (Step S160).

Next, the management-table managing unit 34 extracts a physical block in which the TRIM flag is on from the block management table 50 to extract the physical block in which all physical pages are the TRIM target from the MS 11 of the NAND memory 10 (Step S300). Moreover, the management-table managing unit 34 refers to the invalid flag and the TRIM flag of the page management table 60 to extract a physical block in which all physical pages are invalid or the TRIM target from the MS 11, the FS 12, or the IS 13 of the NAND memory 10 (Step S300). In other words, a physical block in which the invalid flag is on or the TRIM flag is on in all physical pages is extracted from the page management table 60.

Then, the management-table managing unit 34 sets the entry of the physical block management table 70 corresponding to the extracted physical block to unused to release the extracted physical block as a free block (Step S310). As described above, in a page entry in the page management table 60 generated for the MS 11, management of invalid/valid in page units is not performed, so that when the invalid flag in the page management table 60 for the MS 11 is to be referred to at Step S300, the page management table 60 for the MS 11 is generated such that the invalid flag for all pages in the page management table 60 is off (valid). Moreover, it is applicable that the page management table 60 for the MS 11 and the page management table 60 for the FS 12 and the IS 13 can be distinguished and the page management table 60 for the MS 11 and the page management table 60 for the FS 12 and the IS 13 are managed separately. In the case of the page management table 60 for the MS 11, it is applicable that a column of the invalid flag is not provided or only a column of the TRIM flag is referred to without referring to the column of the invalid flag at Step S300. Furthermore, in the case of the page management table 60 for the MS 11, it is sufficient that the relationship between the logical page address and the TRIM flag is identified.

Next, the management-table managing unit 34 determines whether there are page entries of the page management table that can be released (Step S320). In this case, the page entries of the page management table that can be released are the page entries in physical block units as shown in FIG. 6 including page entries which are all invalid or for all of which the TRIM specification is made. When there is the page management table that can be released, the management-table managing unit 34 releases (deletes) all page entries of the page management table 60 corresponding to the physical block released at Step S310 (Step S330). For example, in the page management table in FIG. 6, when the invalid flag or the TRIM flag of each page entry belonging to a physical block address X becomes "1" and the physical block of the physical block address X is released, each page entry belonging to this physical block address X is deleted.

For example, when the TRIM request of the LBA address as shown in (a) in FIG. 9 is made for the storage area of the MS 11, Step S105 becomes YES and the TRIM flag of the block management table 50 for two matching blocks that match the block align boundaries is set on at Step S110. Moreover, Step S115 becomes NO or YES and Step S125 becomes NO, and the TRIM flag of the block management table 50 is referred to at Step S300, so that at least two blocks are released at Step S310. The term "at least" indicates that a block to be released in the FS 12 or the IS 13 may be present by setting the TRIM flag on at Step S120. In this case, because the page management table 60 corresponding to the blocks released in the MS 11 is not present, Step S320 becomes NO and the page management table is not released.

When the TRIM request of the LBA address as shown in (b) in FIG. 9 is made for the storage area of the MS 11, Step S105 becomes YES and the TRIM flag in the block management table 50 corresponding to one matching block that matches the block align boundaries is set on at Step S110. Thereafter, Step S115 becomes NO or YES and Step S125 becomes YES. Moreover, Step S130 becomes YES and Step S135 becomes YES. In this example, the TRIM request corresponding to the fractional area shown in (b) in FIG. 9 is made for the first time, so that Step S140 becomes NO, and after page entries for one block including page entries corresponding to the fractional area are generated, the TRIM flag of all page entries corresponding to the fractional area in the page management table 60 is set on at Step S160. In other words, at Step S160, the FS 12 and the IS 13 are searched to determine whether valid data corresponding to the fractional area is present in the FS 12 or the IS 13, and when at least one valid data corresponding to the fractional area is present in the FS 12 or the IS 13, the TRIM flag of a corresponding page entry of the page management table for the FS 12 or the IS 13 is set on and the TRIM flag of the page entries corresponding to the fractional area in the page entries for one block generated at Step S155 is set on. Then, the block management table 50 is referred to at Step S300, so that at least one block is released at Step S310. In this case, because the page management table 60 corresponding to the block (matching area) released in the MS 11 is not present, Step S320 becomes NO and release of the page management table is not performed.

Thereafter, it is assumed that the TRIM request of the LBA address as shown in (d) in FIG. 9 is made for the storage area of the MS 11. In this case, Step S100 becomes NO, Step S130 becomes YES, and Step S135 becomes YES. In this case, entries of an area of the page management table are already generated when the TRIM processing in (b) in FIG. 9 is performed; however, page entries for one block including a β area are not present, so that the determination at Step S140 becomes NO, and the page management table for one block including the β area is newly generated. Then, at Step S160, the TRIM flag of the remaining page entries (α area) among the page entries for one block for the MS 11 that are already generated are set on, and the TRIM flag of the page entries corresponding to the β area among the page entries for one block that are newly generated are set on. Moreover, at Step S160, it is searched whether valid data corresponding to the area (α+β area) for which the LBA specification is made this time is present in the FS 12 or the IS 13, and when at least one valid data corresponding to the area (α+β area) is present in the FS 12 or the IS 13, the TRIM flag of a corresponding page entry in the page management table for the FS 12 or the IS 13 is set on. Therefore, at least one block (block including the α area) is released at Step S310 by referring to the page management table 60 at Step S300. In this case, because the page management table 60 corresponding to the block released in the MS 11 is present, Step S320 becomes YES and the page management table corresponding to the released block is released at Step S330.

Figure 10:
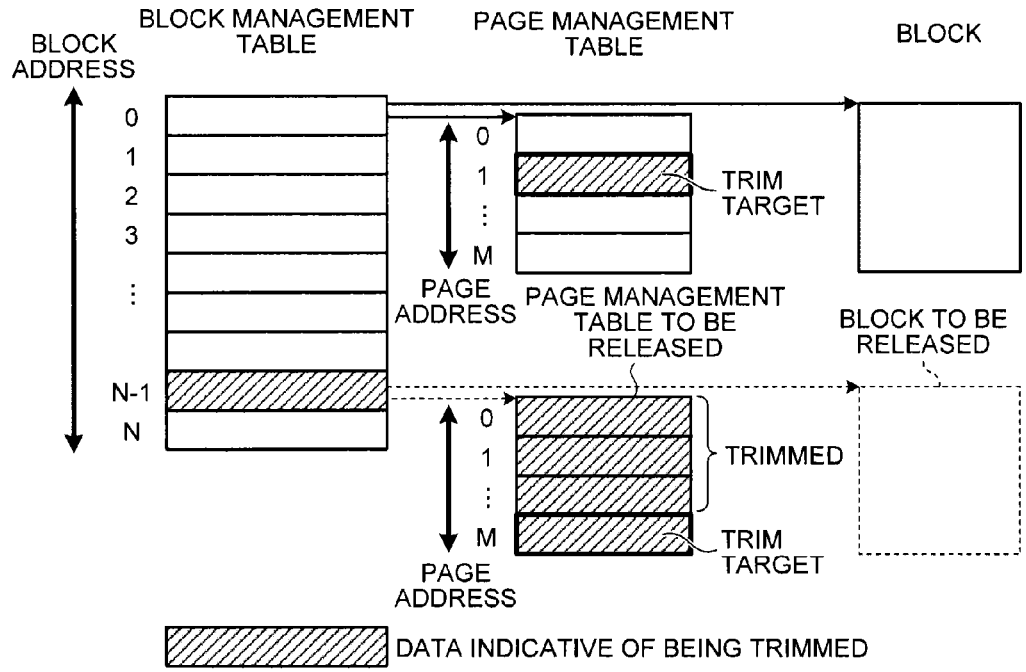
FIG. 10 is a diagram illustrating a block release in the first embodiment.

FIG. 10 is a diagram schematically illustrating a block release and release of the page management table in the first embodiment, and illustrate that pages that are trimmed are registered in order in the page management table and the block release and the release of the page management table are performed at the time when all pages become the TRIM target.

In this manner, in the first embodiment, the TRIM command is managed in two stages, i.e., in block units and in page units, and a block is released as a free block in response also to the TRIM request in page units, so that the number of blocks released as a free block increases. Whereby, the number of free blocks as a target block of a static wear leveling increases and the number of target blocks of a dynamic wear leveling decreases, which contributes to life extension of an SSD and further increases the speed of the write processing.

In other words, the NAND-type flash memory is a semiconductor memory that needs the erase processing before performing writing, and the life thereof depends on the number of times of rewriting. On the other hand, data recorded in the host device such as a personal computer has both temporal locality and spatial locality. Therefore, when the data is recorded, if the data is directly recorded in an address specified from the host device, rewriting, i.e., the erase processing concentrates in a short time in a specific area and a bias in the number of times of erasing increases. Therefore, in the NAND-type flash memory, processing called wear leveling for equalizing the number of times of rewriting between blocks is performed. The wear leveling control includes the static wear leveling that performs writing and erasing from a block of which number of times of rewriting is small and the dynamic wear leveling that exchanges a block on which rewriting is not performed for a long time and of which number of times of rewriting is small with a block of which number of times of rewriting is large. In the case of the dynamic wear leveling, although it is explained that a block is exchanged, writing to the block actually occurs. Therefore, a block that is not released by the TRIM command becomes a target of the dynamic wear leveling and unnecessary writing occurs. However, when a block is released as a free block by the TRIM command, the block does not become a target of the dynamic wear leveling, so that unnecessary writing does not occur.

Moreover, when update writing occurs to part of a block that is not released by the TRIM command, processing is performed in which an area other than the part of the block is read out and data in the read area and data that is subjected to the update writing are merged to be written in a different block. When a block is released by the TRIM command, the read processing does not occur and only writing of data subjected to the update writing occurs. Thus, efficient release of a block as a free block by the TRIM command leads to high-speed writing.

It is applicable that a sector management table is provided instead of the page management table to respond to normally the TRIM up to sector units.

(Second Embodiment)

In the second embodiment, the TRIM command is managed in three stages, i.e., in block units, in page units, and in sector units to respond to the DRAT. It is applicable to respond to the DRAT by the management in two stages of the block management table in which management in block units is performed and the sector management table in which management in sector units is performed. Moreover, it is applicable to respond to the DRAT by attaching the sector flag as shown in FIG. 3 that indicates valid/invalid of each sector belonging to each page to the page management table.

In the second embodiment, for example, a sector management table 80 as shown in FIG. 11 is added. The sector management table manages data stored in the MS 11, the FS 12, and the IS 13 in sector units, and the configuration thereof is arbitrary so long as a correspondence relationship between the logical sector address of the LBA and information indicating the physical page address and an intra-page sector position thereof that indicate a sector storage position in the NAND memory 10 is recorded and the invalid flag indicating valid/invalid of each sector and the TRIM flag indicating whether the TRIM specification is made for each sector are added. For example, as the sector management table, a forward lookup table for obtaining a storage position in the NAND memory from the logical sector address can be prepared, a reverse lookup for obtaining the logical sector address from the storage position in the NAND memory can be prepared, or both of them can be prepared. Moreover, a double-linked list structure, the above described sector flag to be attached to the page management table, or the like can be employed.

In FIG. 11, the sector management table 80 includes page entries for a plurality of physical page addresses, and includes sector entries for the number of sectors (two to the s-th power) in a physical page for each page entry. In each sector entry, the management information that includes the logical sector address of the LBA, the invalid flag indicating whether the sector address is invalid or valid, and the TRIM flag indicating whether the TRIM specification is made for the sector is recorded. In the sector management table 80 in FIG. 11, an intra-physical-page physical sector address is managed by a storage position in a page entry. For example, data of a logical sector address A is stored in a sector 0 of a physical page address X, and data of a logical sector address D is stored in a sector 1 of a physical page address Y. A sector in which the invalid flag is on is a sector that is not to be referred as a result that latest data having the same LBA is written in a different location. In the sector management table again, the TRIM flag and the invalid flag can be managed by the same flag.

The sector management table 80 is not generated until receiving the DRAT request, and is generated after receiving the DRAT request and is released (deleted) as needed.

Figure 12A:
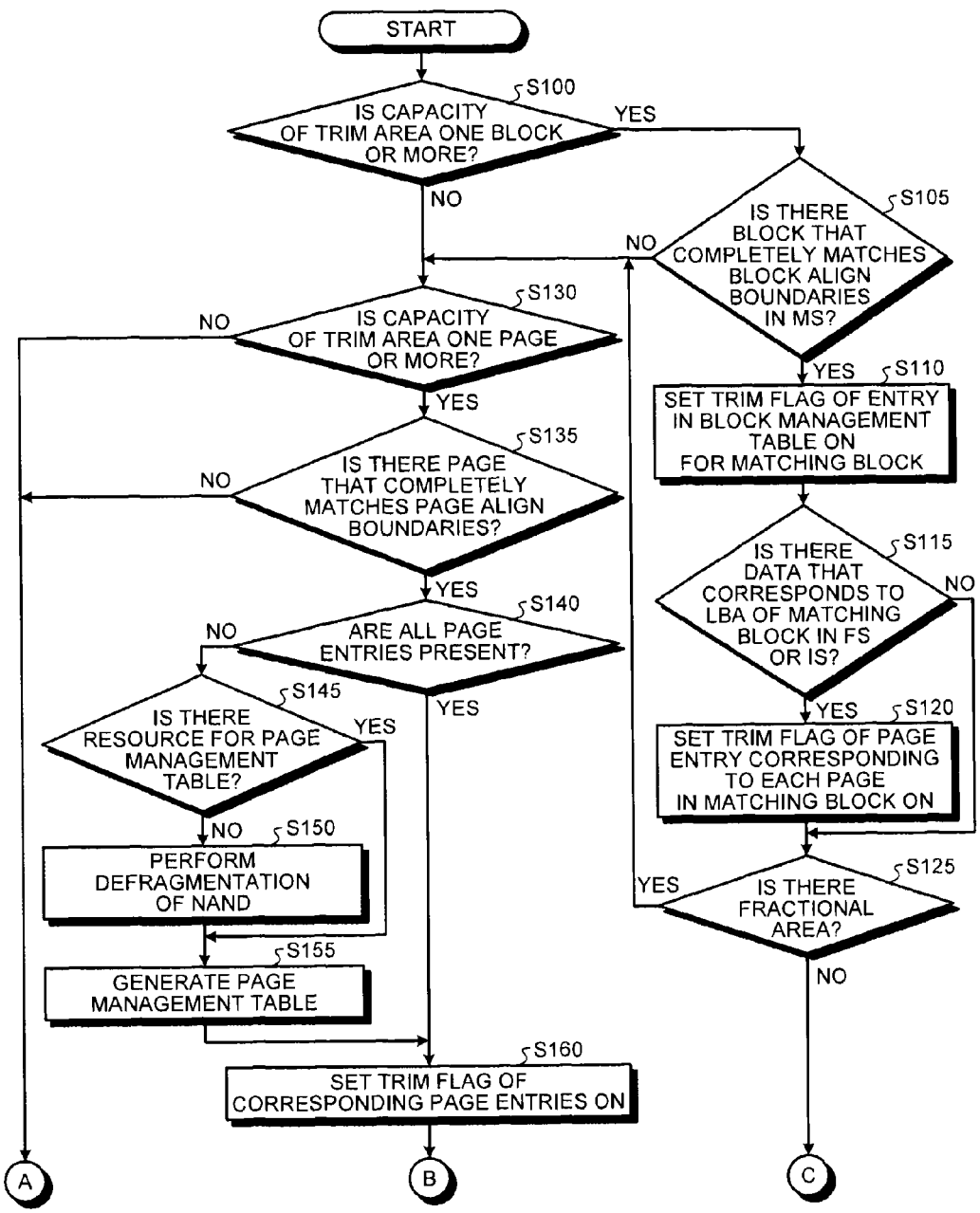

Next, DRAT response processing in the second embodiment is explained in accordance with a flowchart shown in FIGS. 12A and 12B. In the flowchart of FIGS. 12A and 12B, Step S190 to Step S240 are added to the flowchart of FIG. 8 and Step S300 to Step S330 of FIG. 8 are replaced by Step S400 to Step S450, and overlapping explanation is omitted.

At Step S190 in FIG. 12B, it is determined whether there is the fractional area with respect to the align boundary in page units. In FIGS. 12A and 12B, when the determination at Step S130 is NO, the determination at Step S135 is NO, or the determination at Step S190 is YES, it is determined whether entries are present in the sector management table 80 for the TRIM area (Step S200). When there are required sector entries in the sector management table 80, the management-table managing unit 34 sets the TRIM flag of the entries of the corresponding sector addresses of the sector management table 80 on (Step S240).

On the other hand, when it is determined that the required sector entries are not present in the sector management table 80 at Step S200, the management-table managing unit 34 determines whether there is a resource for storing the sector management table in the RAM 20 and the NAND memory 10 (Step S210), and when it is determined that there is not enough resource, the defragmentation processing unit 35 performs the defragmentation processing (Step S220) to secure the resource for storing the sector management table in the NAND memory 10 and the RAM 20. In other words, with the defragmentation processing, page entries of the page management table are reduced, and consequently, the resource for generating the sector management table is secured in the management-information storing unit 22 of the RAM 20 and the management-information storing unit 14 of the NAND memory 10.

When the determination at Step S210 is YES, or after performing the defragmentation of the NAND memory 10 at Step S220, the management-table managing unit 34 generates sector entries corresponding to the TRIM area (Step S230). Then, after generating the sector entries in the sector management table 80, the management-table managing unit 34 sets the TRIM flag of the entries of the corresponding sector addresses to the sector management table 80 on (Step S240).

At Step S400, any one of or at least two of the block management table 50, the page management table 60, and the sector management table 80 is referred to, so that a physical block in which all of belonging sectors are invalid or the TRIM specification is made for all of belonging sectors is extracted and the extracted physical block is released in the similar manner to the above (Step S410).

Next, the management-table managing unit 34 determines whether there is the page management table that can be released in the similar manner to the above (Step S420). When there is the page management table to be released, the management-table managing unit 34 releases (deletes) all page entries of the page management table 60 corresponding to the physical block released at Step S410 and sets the TRIM flag of the entry of the block management table 50 corresponding to the released physical block on to be able to respond to the DRAT (Step S430).

Next, the management-table managing unit 34 determines whether there is the sector management table that can be released (Step S440). The sector management table that can be released is sector entries in physical page units that include sector entries which are all invalid or for all of which the TRIM specification is made. For example, in the sector management table in FIG. 11, when the invalid flag or the TRIM flag of each sector entry belonging to a physical page address X becomes "1" and the physical block that includes the physical page of the physical page address X is released, each sector entry belonging to this physical page address X can be released. When there is the sector management table to be released, the management-table managing unit 34 releases (deletes) all sector entries of the sector management table 80 corresponding to the physical block released at Step S410 and sets the TRIM flag of page entries of the page management table 60 corresponding to all physical pages included in the released physical block on to be able to respond to the DRAT (Step S450).

In the second embodiment that supports the DRAT, the TRIM-area determining unit 33 determines whether valid data for which the TRIM specification is made is in the cache memory 21 (the WC 21a and the RC 21b), and, when the valid data for which the TRIM specification is made is in the cache memory 21, performs processing of changing the valid data on the cache memory 21 into invalid data. In the invalidation processing, for example, in the cache management table 40 in FIG. 3, the sector flag of a sector included in the TRIM area is set to invalid data.

When a read request command is input from the host 1, the command is interpreted by the command interpreting unit 31 and a read target area is searched for from entries of the block management table 50, the page management table 60, and the sector management table 80, and when the TRIM flag in the entry corresponding to the read target area is on, the response-data generating unit 36 is started to generate predetermined response data and send it to the read-and-write control unit 32, and the predetermined response data is output to the host 1 by the read-and-write control unit 32.

In this manner, in the second embodiment, the TRIM area is managed in three stages, i.e., in block units, in page units, and in sector units by the management table to respond to the DRAT, which results in increasing the speed of processing at the time of supporting the DRAT and extending the life of the storage device.

In the first and second embodiments, the management unit is a page and a block; however, the management unit of the MS 11 is arbitrary so long as the management unit is equal to or smaller than a block and is larger than a page. Moreover, the management unit of the FS 12 and the IS 13 is arbitrary so long as the management unit is equal to or larger than a sector and is smaller than the management unit of the MS 11. When the management unit of the MS 11 is smaller than a block, a block in which the TRIM specification is made for all areas in the management unit is released in the MS 11. Moreover, presence or absence of the TRIM specification is identified by the TRIM flag; however, other methods can be employed such as setting data itself to NULL data. Furthermore, any one of the FS 12 and the IS 13 that are managed in pages can be deleted.

(Third Embodiment)

Figure 13:
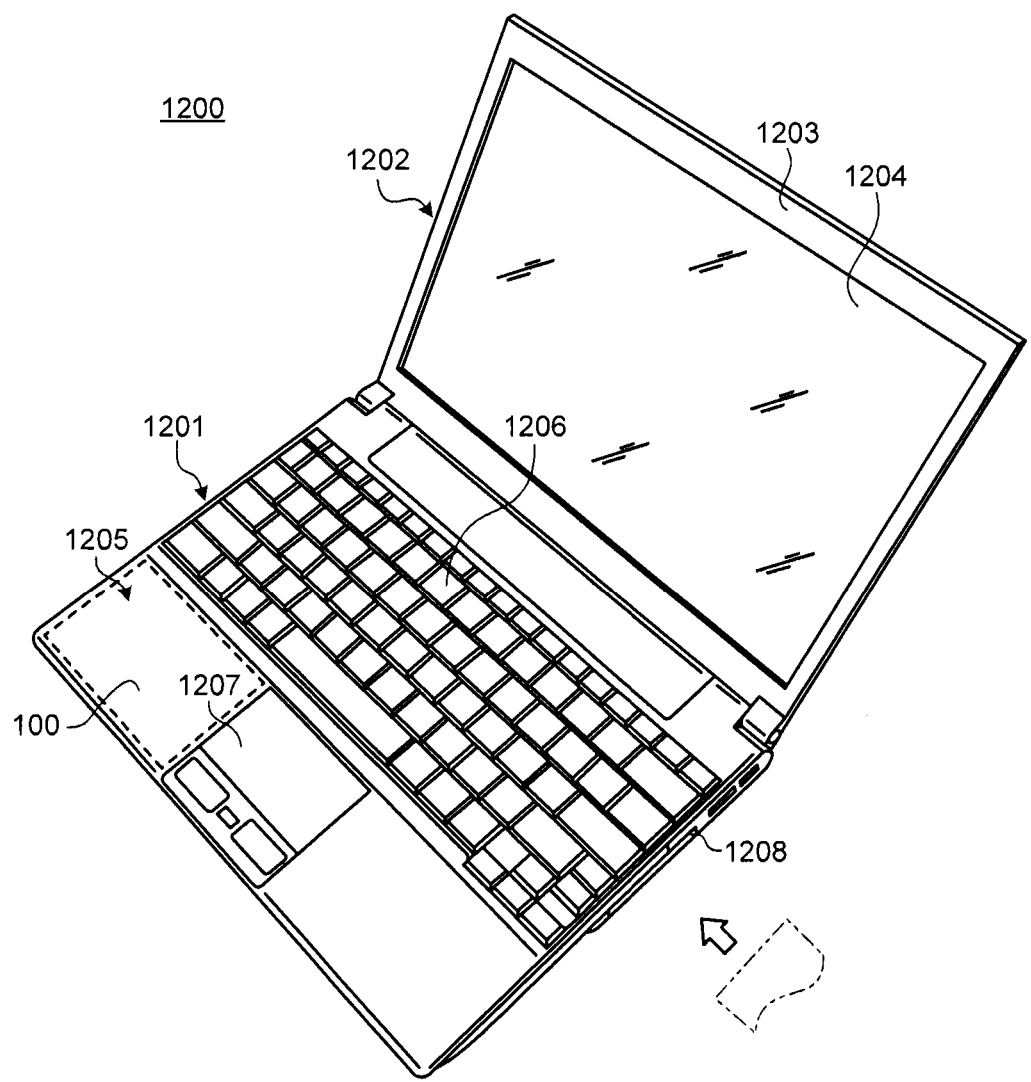
FIG. 13 is an overall view of a personal computer on which an SSD is mounted.

FIG. 13 is a perspective view illustrating an example of a personal computer 1200 on which the SSD 100 is mounted. The personal computer 1200 includes a main body 1201 and a display unit 1202. The display unit 1202 includes a display housing 1203 and a display device 1204 accommodated in the display housing 1203, and the above TRIM command is output from such personal computer 1200 to the SSD 100.

The main body 1201 includes a chassis 1205, a keyboard 1206, and a touch pad 1207 as a pointing device. The chassis 1205 includes therein a main circuit board, an ODD (Optical Disk Device) unit, a card slot, and the SSD 100.

The card slot is provided so as to be adjacent to the peripheral wall of the chassis 1205. The peripheral wall has an opening 1208 facing the card slot. A user can insert and remove an additional device into and from the card slot from outside of the chassis 1205 through the opening 1208.

The SSD 100 can be used instead of a conventional HDD in the state of being mounted on the personal computer 1200 or can be used as an additional device in the state of being inserted into the card slot of the personal computer 1200.

Figure 14:
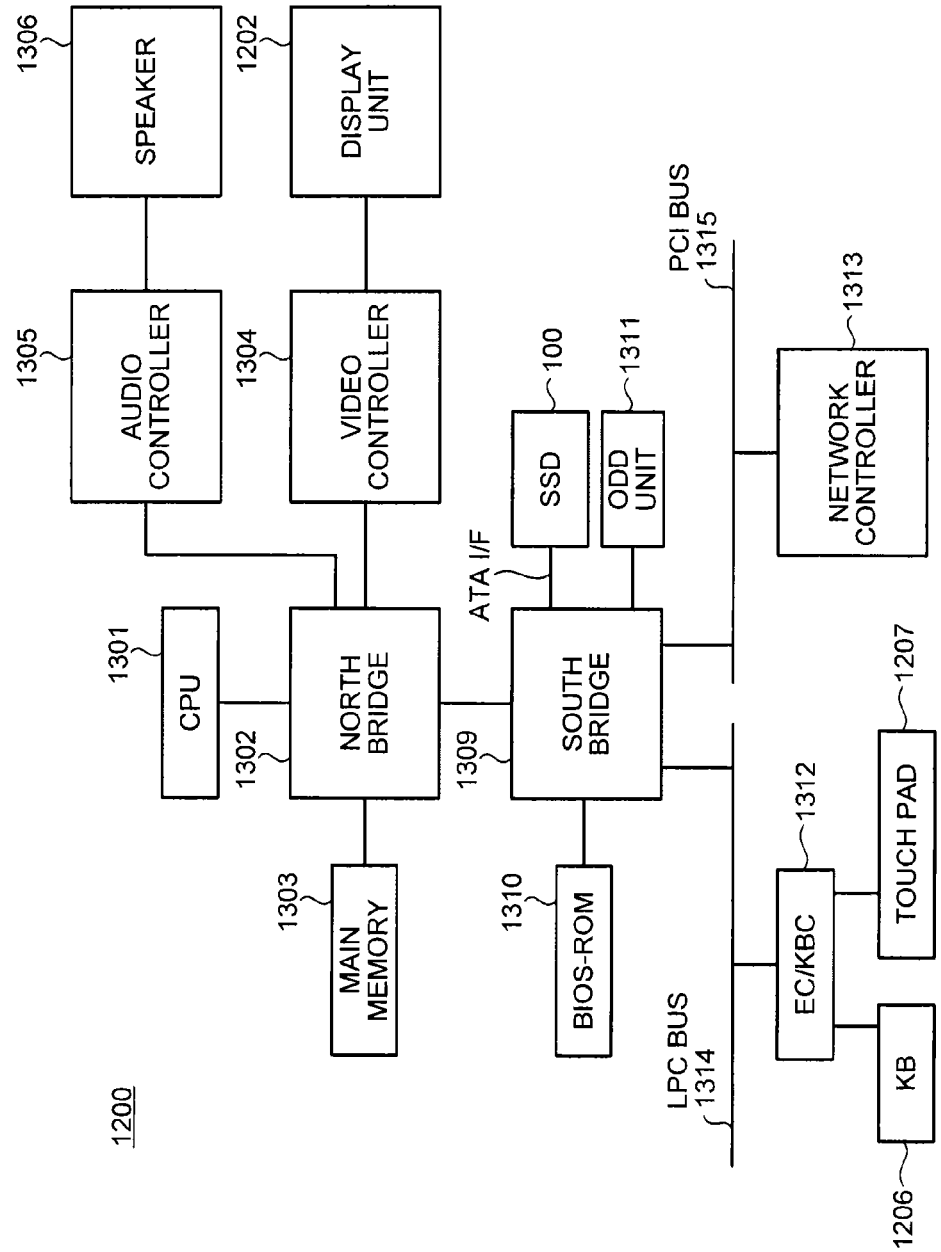
FIG. 14 is a diagram illustrating a system configuration example of the personal computer on which the SSD is mounted.

FIG. 14 illustrates a system configuration example of the personal computer on which the SSD is mounted. The personal computer 1200 includes a CPU 1301, a north bridge 1302, a main memory 1303, a video controller 1304, an audio controller 1305, a south bridge 1309, a BIOS-ROM 1310, the SSD 100, an ODD unit 1311, an embedded controller/keyboard controller IC (EC/KBC) 1312, and a network controller 1313.

The CPU 1301 is a processor provided for controlling an operation of the personal computer 1200, and executes an operating system (OS) loaded from the SSD 100 onto the main memory 1303. Furthermore, when the ODD unit 1311 is capable of executing at least one of read processing and write processing on a mounted optical disk, the CPU 1301 executes the processing.

Moreover, the CPU 1301 executes a system BIOS (Basic Input Output System) stored in the BIOS-ROM 1310. The system BIOS is a program for a hardware control in the personal computer 1200.

The north bridge 1302 is a bridge device that connects a local bus of the CPU 1301 to the south bridge 1309. The north bridge 1302 has a memory controller for controlling an access to the main memory 1303.

Moreover, the north bridge 1302 has a function of executing communication with the video controller 1304 and communication with the audio controller 1305 through an AGP (Accelerated Graphics Port) bus and the like.

The main memory 1303 temporarily stores therein a program and data, and functions as a work area of the CPU 1301. The main memory 1303, for example, is composed of a DRAM.

The video controller 1304 is a video reproduction controller for controlling the display unit 1202 used as a display monitor of the personal computer 1200.

The audio controller 1305 is an audio reproduction controller for controlling a speaker 1306 of the personal computer 1200.

The south bridge 1309 controls each device on a LPC (Low Pin Count) bus 1314 and each device on a PCI (Peripheral Component Interconnect) bus 1315. Moreover, the south bridge 1309 controls the SSD 100 that is a storage device storing various types of software and data through the ATA interface.

The personal computer 1200 accesses the SSD 100 in sector units. A write command, a read command, a cache flush command, and the like are input to the SSD 100 through the ATA interface.

The south bridge 1309 has a function of controlling an access to the BIOS-ROM 1310 and the ODD unit 1311.

The EC/KBC 1312 is a one-chip microcomputer in which an embedded controller for power management and a keyboard controller for controlling the keyboard (KB) 1206 and the touch pad 1207 are integrated.

This EC/KBC 1312 has a function of turning on/off the personal computer 1200 based on an operation of a power button by a user. The network controller 1313 is, for example, a communication device that executes communication with an external network such as the Internet.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A semiconductor storage device comprising:
    a first storage area that includes a plurality of blocks;
    a second storage area that includes a plurality of blocks; and
    a controller, the controller being configured to:
        manage, by a first management unit, first data, the first data being stored in the first storage area, the first management unit being larger than a sector;
        manage, by a second management unit, second data, the second data being stored in the second storage area, the second management unit being larger than the first management unit, and equal to or smaller than a block;
        manage, by the first management unit, whether the first data is specified by a trim request;
        manage, by the first management unit and the second management unit, whether the second data is specified by the trim request;
        release a first block from the first storage area, the first block being filled with third data, the third data being the first data specified by the trim request, the third data being data managed by the first management unit;
        release a second block from the second storage area, the second block being filled with fourth data, the fourth data being the second data specified by the trim request, the fourth data being data managed by the first management unit; and
        release a third block from the second storage area, the third block being filled with fifth data, the fifth data being the second data specified by the trim request, the fifth data being data managed by the second management unit.

2. The semiconductor storage device according to claim 1, wherein
    the controller includes a first management table and a second management table, the first management table managing the third data and the fourth data by a logical address of the first management unit, the second management table managing the fifth data by a logical address of the second management unit.

3. The semiconductor storage device according to claim 2, wherein
    the controller is configured to:
        release a first entry of the first management table, the first entry being an entry that manages the third data included in the first block or the fourth data included in the second block, and
        release a second entry of the second management table, the second entry being an entry that manages the fifth data included in the third block.

4. The semiconductor storage device according to claim 2, wherein, when a logical address range specified by the trim request is equal to or larger than the second management unit, the controller determines, based on the second management table, whether the fifth data is present in the second storage area, the fifth data having a logical address range included in the logical address range specified by the trim request.

5. The semiconductor storage device according to claim 4, wherein, when the fifth data is registered in the second management table, the controller asserts a trim flag of an entry corresponding to the fifth data in the second management table.

6. The semiconductor storage device according to claim 5, wherein the controller determines, based on the first management table, whether the third data is present in the first storage area, the third data having a logical address range included in the logical address range of the fifth data.

7. The semiconductor storage device according to claim 6, wherein, when the third data is registered in the first management table, the controller asserts a trim flag of an entry corresponding to the third data in the first management table.

8. The semiconductor storage device according to claim 4, wherein the controller is configured
    when the logical address range specified by the trim request is smaller than the second management unit and equal to or larger than the first management unit, to determine, based on the first management table, whether the third data is present in the first storage area, and whether the fourth data is present in the second storage area, the third data having a logical address range included in the logical address range specified by the trim request, the fourth data having a logical address range included in the logical address range specified by the trim request, and
    when the logical address range specified by the trim request is smaller than the first management unit, not to set the logical address range specified by the trim request as a trim target.

9. The semiconductor storage device according to claim 8, wherein,
    when the third data or the fourth data is registered in the first management table, the controller asserts a trim flag of an entry corresponding to the third data or the fourth data in the first management table.

10. The semiconductor storage device according to claim 1, wherein the controller is configured to, when a capacity of the first storage area is saturated, consolidate a plurality of pieces of the first data of the first management unit stored in the first storage area into the second data of the second management unit and moves the consolidated data to the second storage area.

11. The semiconductor storage device according to claim 2, wherein the controller is configured to, when a resource for generating an entry of the first management table is not sufficient in a nonvolatile semiconductor memory, consolidate a plurality of pieces of the first data of the first management unit stored in the first storage area into the second data of the second management unit and moves the consolidated data to the second storage area.

12. The semiconductor storage device according to claim 1, wherein
the controller is configured to:
manage, by a sector unit, whether the first data is specified by the trim request,
manage, by the sector unit, whether the second data is specified by the trim request,
release a fourth block from the first storage area, the fourth block being filled with sixth data, the sixth data being the first data specified by the trim request, the sixth data being data managed by the sector unit, and
release a fifth block from the second storage area, the fifth block being filled with seventh data, the seventh data being the second data specified by the trim request, the seventh data being data managed by the sector unit.

13. The semiconductor storage device according to claim 12, wherein the controller includes a third management table, the third management table managing the sixth data and the seventh data by a logical address of the sector unit.

14. The semiconductor storage device according to claim 13, wherein
the controller releases a third entry of the third management table, the third entry managing the sixth data included in the fourth block or the seventh data included in the fifth block.

15. The semiconductor storage device according to claim 13, wherein the controller is configured to, when a resource for generating an entry of the third management table is not sufficient in a nonvolatile semiconductor memory, consolidate a plurality of pieces of the first data of the first management unit stored in the first storage area into the second data of the second management unit and moves the consolidated data to the second storage area.

16. The semiconductor storage device according to claim 1, further comprising
a cache memory coupled with the nonvolatile semiconductor memory, wherein
the controller is configured to perform:
a first flushing for flushing a plurality of pieces of data of a sector unit written in the cache memory to the first storage area as data of the first management unit; and
a second flushing for flushing a plurality of pieces of data of the sector unit written in the cache memory to the second storage area as data of the second management unit.

17. The semiconductor storage device according to claim 16, wherein
the controller is configured to:
when performing the first flushing, flush low-density data in which valid data is included at less than a predetermined ratio in a predetermined logical address range to the first storage area; and
when performing the second flushing, flush high-density data in which valid data is included at more than the predetermined ratio in the predetermined logical address range to the second storage area.

18. The semiconductor storage device according to claim 1, wherein
the controller is configured to:
manage whether data stored in the first or second storage areas are invalid or valid by the first management unit,
manage whether data stored in the second storage area is invalid or valid by the second management unit,
release a sixth block from the first storage area, the sixth block being filled with eighth data, the eighth data being the first data specified by the trim request or specified invalid, the eighth data being data managed by the first management unit;
release a seventh block from the second storage area, the seventh block being filled with ninth data, the ninth data being the second data specified by the trim request or specified invalid, the ninth data being data managed by the first management unit; and
release an eighth block from the second storage area, the eighth block being filled with fifth tenth, the tenth data being the second data specified by the trim request or specified invalid, the tenth data being data managed by the second management unit.

19. The semiconductor storage device according to claim 16, wherein the controller is configured to, when data specified by the trim request is present in the cache memory, invalidate the data specified by the trim request on the cache memory.

20. The semiconductor storage device according to claim 1, wherein the controller is configured to, when receiving a read request designating data which has been specified by the trim request, return predetermined response data to a host apparatus.

* * * * *